US007482526B2

(12) United States Patent
Yanase et al.

(10) Patent No.: US 7,482,526 B2
(45) Date of Patent: Jan. 27, 2009

(54) TECHNIQUE FOR SUPPLYING UNIQUE ID TO ELECTRONIC MUSICAL APPARATUS

(75) Inventors: Tsutomu Yanase, Hamamatsu (JP); Satoru Umezawa, Kakegawa (JP); Ikuro Oshima, Hamamatsu (JP); Taro Tokuhiro, Fort Lee, NJ (US)

(73) Assignee: Yamaha Corporation, Hamamatsu-shi (JP)

( * ) Notice: Subject to any disclaimer, the term of this patent is extended or adjusted under 35 U.S.C. 154(b) by 407 days.

(21) Appl. No.: 10/992,397

(22) Filed: Nov. 16, 2004

(65) Prior Publication Data

US 2005/0154777 A1 Jul. 14, 2005

Related U.S. Application Data

(63) Continuation-in-part of application No. 10/752,723, filed on Jan. 6, 2004, now abandoned.

(51) Int. Cl.
*G06F 7/04* (2006.01)

(52) U.S. Cl. .......................................... 84/600; 726/5

(58) Field of Classification Search ........... 84/600-602; 726/5

See application file for complete search history.

(56) References Cited

U.S. PATENT DOCUMENTS

| | | | | |
|---|---|---|---|---|
| 5,880,386 | A | 3/1999 | Wachi et al. | |
| 2003/0061115 | A1 | 3/2003 | Wachi | |
| 2003/0196542 | A1 | 10/2003 | Harrison, Jr. | |
| 2004/0154461 | A1 * | 8/2004 | Havukainen et al. | 84/645 |
| 2005/0083407 | A1 * | 4/2005 | Kokusho | 348/207.2 |
| 2006/0080558 | A1 | 4/2006 | Miyoshi et al. | |

FOREIGN PATENT DOCUMENTS

| | | |
|---|---|---|
| EP | 1276098 | 1/2003 |
| JP | 9152986 | 6/1997 |
| JP | 2002/189636 | 7/2002 |
| WO | WO-01/16931 | 3/2001 |

* cited by examiner

*Primary Examiner*—David S. Warren
(74) *Attorney, Agent, or Firm*—Morrison & Foerster LLP

(57) ABSTRACT

Electronic musical apparatus (EMA), e.g. an electronic musical instrument, has a storage area for storing a unique ID; however, unique ID is empty in the storage area in an initial condition, e.g. condition at the time of shipment from a factory. Unique ID is issued by a Web server to the EMA when a user having acquired the EMA accesses a predetermined Web site having an ID issuing function, and the EMA stores the supplied unique ID in the storage area. The Web server determines whether or not any unique ID has already been issued to a given EMA having accessed the Web site, and, if not yet issued, the Web server may automatically issue a unique ID. Alternatively, the Web server may issue a unique ID when an ID issuance request has been received from a user of the EMA. User registration operation and unique ID issuance and registration operations may be carried out together as a set of operations.

6 Claims, 5 Drawing Sheets

TECHNIQUE FOR SUPPLYING UNIQUE ID TO ELECTRONIC MUSICAL APPARATUS

RELATED APPLICATION

This application is a continuation-in-part application of our corresponding U.S. application Ser. No. 10/752,723 filed Jan. 6, 2004 and now pending.

BACKGROUND OF THE INVENTION

The present invention relates to techniques for supplying unique identification information (IDs) to various types of electronic musical apparatus, such as electronic musical instruments and automatic performance apparatus, possessed by users.

Generally, unique identification numbers (IDs), such as serial numbers, are imparted, for purposes of appropriate management, to individual electronic musical instruments or other electronic musical apparatus manufactured in factories and then supplied (sold) to users. According to the conventionally-known ID imparting method, unique IDs, for example, in the form of serial production numbers, are imparted to individual electronic musical apparatus products at a suitable stage (e.g., final stage) of manufacture of the musical apparatus in a factory. Typically, the unique ID impartment has been performed by pasting seals, bearing unique IDs, to the individual electronic musical apparatus products. At a final stage of manufacture in a factory, each completed electronic musical apparatus product with it's unique ID imparted thereto is put in a packaging case, a registration card bearing the same unique ID is also put in the case. User having purchased the electronic musical apparatus product can make a user registration by putting his or her name, address, etc. on the registration card and sending the registration card back to the manufacturer. Nowadays, it has also become possible to make a user registration by manually entering the unique ID, such as a serial number, on a Web site of the manufacturer.

Japanese Patent Application Laid-open Publication No. 2003-99627 proposes a technique for eliminating the trouble of manually entering the unique ID when making the user registration. According to the proposed technique, the unique ID is stored, in a non-volatile manner, in a memory within the electronic musical apparatus at a suitable stage of the manufacturing of the electronic musical apparatus product in the factory. Subsequently, when a user, having purchased the electronic musical apparatus product, accesses a Web site of the manufacturer to make a user registration, the user sends the unique ID, previously stored in the memory of the apparatus, back to the Web site of the manufacturer. The proposed technique can dispense with the operation for manually entering the unique ID during the user registration procedure, and thereby reduce a burden on the user. However, the steps of imparting and storing the unique ID in the memory, during the manufacture of the electronic musical apparatus product, would become a significant factor that adds to the manufacturing costs.

SUMMARY OF THE INVENTION

In view of the foregoing, it is an object of the present invention to provide an improved technique which can simplify a process for imparting unique IDs to individual electronic musical apparatus and thereby avoid imposing an extra burden on manufacturing of the musical apparatus.

In order to accomplish the above-mentioned object, the present invention provides an electronic musical apparatus including a memory having a storage area for storing unique identification information in a non-volatile manner, unique identification information being empty in the storage area in an initial condition under which the electronic musical apparatus is used by a user for a first time. The electronic musical apparatus of the present invention comprises a processor coupled with the memory, and the processor is adapted to: access, via a communication network, a predetermined Web site having an identification information issuing function; and acquire a unique identification information, specific to the electronic musical apparatus, from the Web site, and then store the acquired unique identification information in the storage area of the memory.

The electronic musical apparatus has the storage area for storing a unique ID; however, no unique ID is stored yet in the storage area in an initial state or condition (e.g., condition at the time of shipment from a factory). Unique ID is issued and supplied by the Web server to the musical apparatus when a user of the musical apparatus, having acquired the musical apparatus, accesses the predetermined Web site having the ID issuing function, and the musical apparatus stores the supplied unique ID in the storage area. Even if no unique ID has been supplied yet in an initial condition, for example, at the time of shipment from a factory, the present invention, where the unique ID is issued by an official Web site, can avoid the problem that a wrong unique ID is issued and registered at a subsequent stage, thereby achieving increased reliability. Further, because the present invention can eliminate the need for performing unique ID issuance/registration operations during the manufacture of the electronic musical apparatus, thereby avoiding increased manufacturing costs.

According an alternative embodiment, even where the electronic musical apparatus does not itself have the Web site accessing function (browsing function), the present invention can be practiced with the assistance of an external processing device, such as a personal computer. Namely, the present invention provides a system which comprises: an electronic musical apparatus including a memory having a storage area for storing unique identification information in a non-volatile manner, unique identification information being empty in the storage area in an initial condition under which the electronic musical apparatus is used by a user for a first time; and a processing device capable of communicating with the electronic musical apparatus. Here, the processing device is adapted to: access, via a communication network, a predetermined Web site having an identification information issuing function; and acquire a unique identification information, specific to the electronic musical apparatus, from the Web site; and deliver the acquired unique identification information to the electronic musical apparatus. Thus, the electronic musical apparatus stores the unique identification information, delivered by the processing device, in the storage area of the memory.

The present invention also provides a server apparatus that builds a Web site for supplying information onto a communication network, which comprises: an ID issuance section that issues unique identification information to a given electronic musical apparatus having accessed the Web site via the communication network; and a transmission section that transmits the unique identification information, issued by the ID issuance section, to the electronic musical apparatus via the communication network. Thus, the electronic musical apparatus can receive the unique identification information transmitted via the communication network and store the received unique identification information in a non-volatile manner.

In an embodiment of the present invention, the ID issuance section makes a determination as to whether or not any unique identification information has already been issued to the given electronic musical apparatus having accessed the Web site, and, when it is determined that no unique identification information has been issued yet, the ID issuance section issues a unique identification information to the given electronic musical apparatus. With such an arrangement, the issuance and registration of the unique ID is automatically executed without the user having to be conscious of and recognize the cumbersome matter as to whether or not the electronic musical apparatus possessed by the user has already been supplied or imparted with a unique ID.

In still another embodiment of the present invention, the ID issuance section issues a unique identification information to the given electronic musical apparatus in response to an ID issuance request received from the given electronic musical apparatus having accessed the Web site. Because the issuance and registration of the unique ID is carried out in response to the ID issuance request from the user of the musical apparatus, the user may request the ID issuance and registration when he or she actually so desires.

In still another embodiment of the present invention, the ID issuance section issues a unique identification information to the given electronic musical apparatus when the server apparatus performs a user registration process in the Web site for the given electronic musical apparatus. In this case, the issuance and registration of the unique ID and the user registration are carried out concurrently as a set of operations, which should be very useful to the user. The arrangement should also be very useful to the server in that necessary management could be unified.

In still another embodiment of the present invention, the server apparatus makes a determination as to whether or not any unique identification information has already been issued to the given electronic musical apparatus having accessed the Web site, and supplies the given electronic musical apparatus with Web page information differing in contents depending on a result of the determination. With such an arrangement, the server apparatus can perform fine and elaborate Web page supply services, e.g. automatically supplying unique-ID issuing Web page information to each user having accessed the server via an electronic musical apparatus with no unique ID issued and registered therefor, and supplying Web page information, providing a particular service, to each user having accessed the server via an electronic musical apparatus with an unique ID already issued and registered therefor (such as Web page information customized for that electronic musical apparatus or its user).

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENTS

Figure 1:
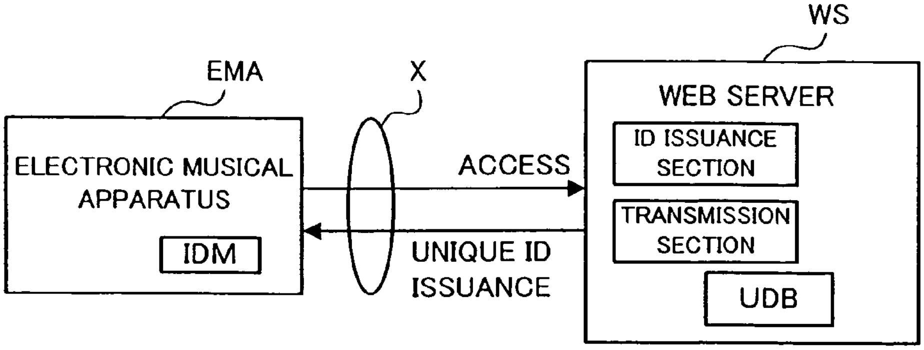
FIG. 1 is a schematic system diagram showing an embodiment of the present invention.

FIG. 1 shows an embodiment of the present invention, and particularly shows an outline of a system where electronic music apparatus EMA of various users (only one of the electronic music apparatus EMA is shown for clarity) and a Web server WS are interconnected via a communication network X for bidirectional communication. The Web server WS is a server apparatus that builds Web sites for supplying various information onto the communication network, and it has a function of issuing unique identification information (hereinafter also called "unique ID") to each electronic musical apparatus EMA having accessed any one of the Web sites; the unique ID is an ID peculiar to or specific to the product of each individual electronic musical apparatus EMA. Each of the electronic musical apparatus EMA may be in the form of any electronic equipment or apparatus, such as an electronic musical instrument, tone generator module, sequencer (automatic performance apparatus), mixer, effecter, karaoke apparatus, portable phone (e.g., cellular phone) or portable terminal equipment, as long as it is constructed to perform music-related processes or actions, such as music performance, music reproduction or music control. Further, the electronic musical instrument used as the electronic musical apparatus may be of any one of a keyboard type, guitar type, drum type and wind instrument type.

In FIG. 1, the user's electronic musical apparatus EMA has a storage area IDM for storing a unique ID in a non-volatile manner. However, in an initial state or condition, e.g. condition at the time of shipment from a factory, such a unique ID is not yet stored in the storage area IDM. The user having purchased or acquired otherwise the electronic musical apparatus EMA is supplied with the unique ID issued from a predetermined Web site provided by the Web server Ws and having a unique-ID issuing function, by accessing the predetermined Web site. The user stores the supplied unique ID in the ID storage area IDM. Process for receiving the issued unique ID is carried out by a processor (e.g., computer) included in the electronic musical apparatus EMA. Namely, the processor accesses the predetermined Web site via the communication network, acquires the unique identification information (ID) specific to the electronic musical apparatus EMA, and stores the acquired unique ID in the storage area IDM.

In an initial state, dummy data (e.g., XXXXXXXX) having the same number of bits as an unique ID, or provisional ID having a predetermined fixed value, may be stored in the storage area IDM in the factory manufacturing the electronic musical apparatus EMA. In this case, the Web server may store in its memory the above-mentioned dummy data or provisional ID prestored in the initial state so that, when the user accesses the Web site for the first time using the electronic musical apparatus EMA, the user can be supplied with a unique ID issued from the Web site and store the supplied unique ID in the storage area IDM.

In the following description, the state where “the storage area IDM is empty (or “unique ID information” is empty in the storage area IDM)” includes not only a state where the storage area IDM is actually empty (i.e., has no contents stored therein) but also a state where predetermined dummy data or provisional ID of a fixed value is stored in the storage area IDM; in a nutshell, it refers to a state where no substantive or effective unique ID is stored in the storage area.

For such purposes, the Web server WS includes an ID issuance section for issuing a respective unique ID to each individual electronic musical apparatus EMA having accessed the predetermined Web site over the communication network, and a transmission section for transmitting the unique ID, issued by the ID issuance section, to the electronic musical apparatus EMA via the communication network. Normally, the functions of the ID issuance section and transmission section are implemented by a computer of the server apparatus. The Web server WS also includes a user database UDB for storing sets of the unique IDs issued to the individual electronic musical apparatus EMA and respective registration information of the individual users of the electronic musical apparatus EMA.

Figure 2:
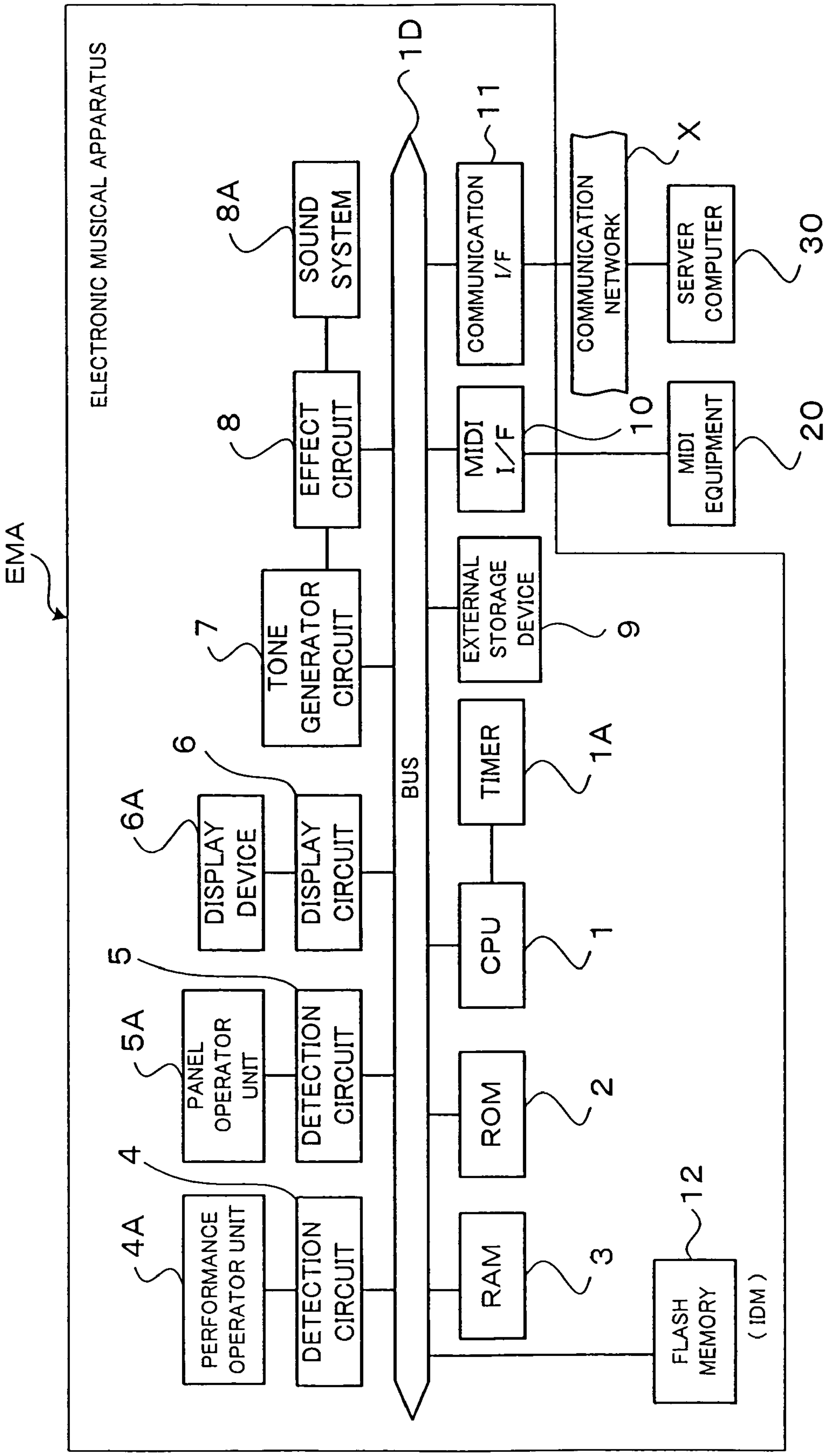
FIG. 2 is a block diagram showing a general hardware setup of an electronic musical apparatus in accordance with one embodiment of the present invention.

FIG. 2 is a block diagram illustrating a general hardware setup of the electronic musical apparatus EMA in accordance with an embodiment of the present invention. This electronic musical apparatus EMA is controlled by a microcomputer comprising a microprocessor unit (CPU) 1, a read-only memory (ROM) 2 and a random-access memory (RAM) 3. The CPU 1 controls all operations of the electronic musical apparatus EMA. To the CPU 1 are connected, via a data and address bus 1D, the ROM 2, RAM 3, detection circuits 4 and 5, display circuit 6, tone generator (T.G.) circuit 7, effect circuit 8, external storage device 9, MIDI interface (I/F) 10, communication interface 11 and a readable/writable non-volatile memory (flash memory in the illustrated example) 12. Also connected to the CPU 1 is a timer 1A for counting various time periods, for example, to signal interrupt timing for a timer interrupt process. Namely, the timer 1A generates tempo clock pulses, which are given to the CPU 1 as processing timing instructions or as interrupt instructions. The CPU 1 carries out various processes in accordance with such instructions.

In an appropriate or predetermined storage area of the non-volatile memory, i.e. flash memory, 12, there is stored, in a non-volatile manner, the unique ID supplied to the electronic musical apparatus EMA. Namely, the flash memory 12 is a memory having the ID storage area IDM shown in FIG. 1.

The ROM 2 has prestored therein various programs, such as an ID acquisition and user registration processing program tailored for the instant embodiment, to be executed by the CPU 1 and various data, such as tone control data and d automatic performance data, to be referred to by the CPU 1. The RAM 3 is used as a working memory for temporarily storing various data generated as the CPU 1 executes a predetermined program, as a memory for storing the currently-executed program and data related thereto, and for various other purposes. Predetermined address regions of the RAM 3 are allocated and used as registers, flags, tables, etc. Performance operator unit 4A is, for example, a keyboard including a plurality of keys for designating pitches of tones and key switches corresponding to the keys. The performance operator unit 4A, such as a keyboard, can be used not only as means for performing tones, but also as input means for selecting a music piece, tone color and the like and as other means. The detection circuit 4 detects depression and release of the keys on the operator unit 4A to thereby produce detection outputs. Panel operator unit 5A includes various switches and operators, such as switches for selecting a tone color and other tone control information and switches for inputting various information pertaining to an automatic performance etc. In addition to such switches, the panel operator unit 5A includes a numeric value keypad for entry of numeric value data, a keyboard for entry of text and character data, and various other operators, such as a mouse for operating a predetermined pointing element displayed on a display device 6A. The detection circuit 5 constantly detects respective operational states of the individual operators on the panel operator unit 5A and outputs switch information, corresponding to the detected operational states of the operators, to the CPU 1 via the data and address bus 1D. The display circuit 6 visually displays not only a musical score of a selected music piece, but also various information pertaining to an automatic performance, controlling state of the CPU 1, etc.

The tone generator (T.G.) circuit 7, which is capable of simultaneously generating tone signals in a plurality of channels, receives performance information supplied via the data and address bus 1D and generates tone signals based on the received performance information. Each of the tone signals thus generated by the tone generator circuit 7 is audibly reproduced or sounded by a sound system 8A after being imparted with en effect via an effect circuit 8. The effect circuit 8 includes a plurality of effect units which impart various effects to the tone signals, generated by the tone generator circuit 7, in accordance with effect parameters. The tone generator circuit 7, effect circuit 8 and sound system 8A may be constructed in any conventionally known manner. For example, any desired tone signal synthesis method may be used in the tone generator circuit 7, such as the FM, PCM, physical model or formant synthesis method. Further, the tone generator circuit 7 may be implemented by either dedicated hardware or software processing performed by the CPU 1.

The external storage device 9 is provided for storing, in a non-volatile manner, tone control data, automatic performance data and data relating to control of various programs executed by the CPU 1. Where a particular control program, which may be the ID acquisition and user registration processing program tailored for the instant embodiment, is not prestored in the ROM 2, the control program may be prestored in the external storage device (e.g., hard disk device) 9, so that, by reading the control program from the external storage device 9 into the RAM 3, the CPU 1 is allowed to operate in exactly the same way as in the case where the particular control program is stored in the program memory 2. This arrangement greatly facilitates version upgrade of the control program, addition of a new control program, etc. The external storage device 9 may use any one of various removable-type media rather than the hard disk (HD), such as a flexible disk (FD), compact disk (CD-ROM or CD-RAM), magneto-optical disk (MO) and digital versatile disk (DVD). Alternatively, the external storage device 9 may use a semiconductor memory.

The MIDI interface (I/F) 10 is an interface provided for receiving or delivering performance information of the MIDI standard MIDI (i.e., MIDI data) from or to other MIDI equipment 20 or the like. Note that the other MIDI equipment 20 may be of any structural or operating type, such as the keyboard type, stringed instrument type, wind instrument type, percussion instrument type or gesture type, as long as it can generate MIDI data in response to manipulations by a user. Note that the MIDI interface 10 may be a general-purpose interface rather than a dedicated MIDI interface, such as RS232-C, USB (Universal Serial Bus) or IEEE1394, in which case other data than MIDI event data may be communicated at the same time. In the case where such a general-purpose interface as noted above is used as the MIDI interface 10, the other MIDI equipment 20 may be designed to communicate other data than MIDI event data. Of course, the performance information handled in the present invention may be of any other data format than the MIDI format, in which case the MIDI interface 10 and other MIDI equipment 20 are constructed in conformity to the data format.

The communication interface (I/F) 11 is connected to a wired or wireless communication network X, such as a LAN (Local Area Network), the Internet or telephone line network, via which it may be connected to a desired sever computer 30 so as to input a control program and various data to the electronic musical apparatus EMA. Thus, in a situation where a particular control program and various data are not contained in the ROM 2 or external storage device (e.g., hard disk) 9, these control program and data can be downloaded from the server computer 30 via the communication interface 11. Such a communication interface 11 may be constructed to be capable of both wired and wireless communication rather than either one of the wired and wireless communication. The sever computer 30 corresponds the computer included in the Web server WS of FIG. 1.

Because the electronic musical apparatus EMA of FIG. 2 is assumed to be in the form of an electronic musical instrument, it is shown as including the operator unit 4A, tone generator circuit 7, effect circuit 8 and sound system 8A. If the electronic musical apparatus EMA is equipment of any other type, it goes without saying that the operator unit 4A, tone generator circuit 7, effect circuit 8 and sound system 8A may be dispensed with, or that their hardware constructions may be different as necessary from those shown in FIG. 2.

Further, even in the case where the electronic musical apparatus EMA is in the form of an electronic musical instrument, the performance operator unit 4A may be of any other type than the keyboard instrument type, such as a stringed instrument type, wind instrument type or percussion instrument type. Furthermore, the electronic musical apparatus EMA is not limited to the type where the performance operator unit 4A, display device 6A, tone generator circuit 7, etc. are incorporated together as a unit within the musical apparatus EMA; for example, the electronic musical apparatus EMA may be constructed in such a manner that the above-mentioned sections are provided separately and interconnected via communication facilities such as a MIDI interface, various networks and/or the like. Moreover, the electronic musical apparatus EMA of the present invention may be in the form of any desired apparatus or equipment, such as a portable communication terminal like a personal computer or portable phone, karaoke apparatus, game apparatus, audio and/or visual apparatus, or other various music-related apparatus. In the case where the electronic musical apparatus EMA of the present invention is a portable communication terminal, part of the predetermined functions may be assigned to the server so that the functions can be performed as a whole jointly by the terminal and the server, instead of the communication terminal performing all of the predetermined functions.

Now, a description will be given about various embodiments of processing for issuing unique IDs to individual electronic musical apparatus EMA and registering individual users, with reference to FIGS. 3 to 5.

Figure 3:
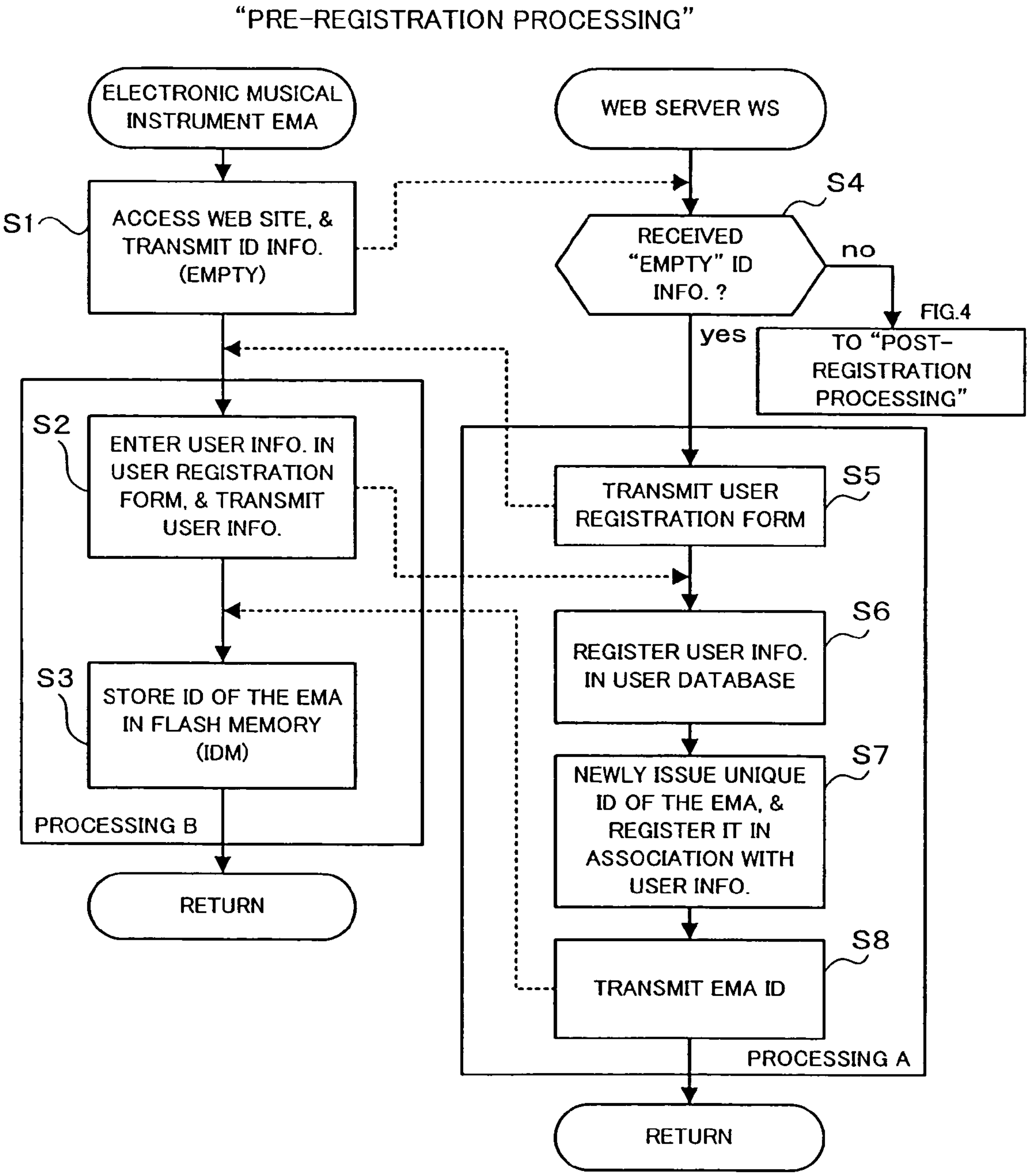
FIG. 3 is a flow chart showing an example of "pre-registration processing" carried out when the electronic musical apparatus accesses a Web site before unique ID registration of the electronic musical apparatus.

FIG. 3 is a flow chart of processing carried out when no unique ID has been issued yet to a given electronic musical apparatus EMA having accessed a predetermined Web site provided by the Web server WS; this processing will be referred to as "pre-registration processing". Various operations performed by the electronic musical apparatus EMA (hereinafter also referred to simply as "EMA") are shown in a left half of the figure, while various operations performed by the Web server WS (hereinafter also referred to simply as "WS") are shown in a right half of the figure. The EMA first performs an operation for transmitting its ID information, at step S1; however, because no unique ID has been issued yet to the musical apparatus EMA in this case, the ID information transmitted by the EMA indicates "empty". Once the WS ascertains that the ID information received from the EMA indicates "empty" (YES determination at step S4), the WS transmits a "user registration form" to the EMA at step S5. If, on the other hand, the ID information received from the EMA does not indicate "empty", the WS proceeds to "post-registration processing" of FIG. 4 (to be detailed in relation to step S18), without further performing the "pre-registration processing of FIG. 3.

In the case where the pre-registration processing is to be continued, the EMA enters necessary user information, such as the name and address of the user and model of the apparatus, in the received user registration form and sends the registration form back to the WS, at step S2. In turn, the WS registers the user information in the user database UDB at step S6, then newly issues a unique ID for the EMA corresponding to the user information, and registers the issued unique ID in the user database UDB in association with the user information, at step S7. Then, the WS transmits the issued unique ID to the EMA at step S8. Specifically, the WS creates an ID data file containing the issued unique ID and transmits the created ID data file to the EMA, at step S8. At step S3, the EMA stores the unique ID, received from the WS, in the flash memory 12 (FIG. 2) that corresponds to the storage area IDM of FIG. 1. Specifically, at step S3, the EMA interprets the ID data file received from the WS, retrieves the unique ID from the interpreted ID data file, and then stores the retrieved unique ID in the flash memory 12. Note that information, permitting identification of the model of the electronic musical apparatus, may be included in the unique ID of the musical apparatus.

Namely, in the embodiment of FIG. 3, the Web server WS determines at step S4 whether or not any unique ID has already been issued and supplied to the electronic musical apparatus EMA having accessed the server WS. If no unique ID has been issued yet, the Web server WS carries out server-side ID issuance and user registration operations of steps S5-S8 (hereinafter collectively called "processing A"), and the electronic musical apparatus EMA carries out "user-side user registration and ID storage operations" of steps S2-S3 (hereinafter collectively called "processing B"). Thus, the embodiment of FIG. 3 is very useful in that the user registration process is performed generally at the same time the issuance, registration and storage of the unique ID is automatically performed. Thus, the issuance and registration of the unique ID is automatically executed without the user having to be conscious of and recognize the cumbersome matter as to whether or not the electronic musical apparatus EMA possessed by the user has already been assigned a unique ID. Also, because the issuance, registration and storage of the unique ID and the user registration are carried out concurrently as a set of operations, the embodiment of FIG. 3 should be very useful to the user. The embodiment of FIG. 3 should also be very useful to the Web server WS in that necessary management of the user database could be unified. Once the electronic musical apparatus EMA accesses the predetermined Web site provided by the Web server WS after completion of the user registration, the unique ID is automatically transmitted from the electronic musical apparatus EMA to the Web server WS at step S1, and thus the user does not have to perform the cumbersome input operation, which should achieve an enhanced simplicity of operation.

Next, a description will be made about an example of the "post-registration processing" with reference to FIG. 4. Transmission of ID information from the EMA (step S1) and a determination by the WS as to whether or not the ID information indicates "empty" (step S4) are similar to those of FIG. 3. Once the WE ascertains that the received ID information does not indicate "empty" (NO determination at step S4), it goes to step S18, where the received ID is compared with the ID already registered for the user in the user database UDB. If the received ID matches the registered ID, the WS allows the user of the EMA to log in. If, on the other hand, if the ID information indicates "empty" as determined at step S4, the WS proceeds to the "pre-registration processing" of FIG. 3 or 5 (step S5 of FIG. 3 or step S35 of FIG. 5 to be later detailed), without further performing the "post-registration processing of FIG. 4.

If the user has logged in, the WS selects an appropriate type of Web page, from among a plurality of different types of Web pages, in accordance with the user information registered in the UDB in association with the received ID, and it transmits the selected type of Web page to the EMA at step S19. In turn, the EMA displays the received Web page on the display device 6A of FIG. 2, at step S11. After that, operations corresponding to the displayed Web page are carried out. In the illustrated example of FIG. 4, where it is assumed that Web sites provided by the WS include services for selling music content and other content, operations pertaining to sale/purchase of content including music content are carried out at subsequent steps S12-S17 and S20-S21. However, it should be apparent that the present invention is not limited to the illustrated example. In the case where the service for selling content including music content is provided like this, the selection of an appropriate type of Web page may be by selecting an appropriate Web page of any of musical genres, such as jazz, rock and classical music. Alternatively, a Web page customized for the particular user may be supplied at step S19.

On the EMA, the user views a Web page displayed on the display device and transmits a purchase request for desired content, at step S12. In turn, the WS performs a billing process, in response to the purchase request, for charging a necessary price (step S20), and it embeds the unique ID of the EMA in the requested content and transmits the content to the EMA (step S21). The unique ID is embedded in the content, for example, with a view to preventing unfair or unauthorized use of the content and protecting the copyright on the content. The embedding of the unique ID may be performed in any desired manner. As a first example, the unique ID may be used as a part of an encryption key to encrypt the content. As a second content, the unique content ID may be embedded as content-use limiting information in the content encrypted with another appropriate encryption key. In either case, the content to be transmitted to the user is encrypted with a view to ensuring enhanced protection and security of the content information.

At step S13, the EMA stores the content, received from the WS, in memory. When using the stored content (YES determination at step S14), the EMA determines at step S15 whether or not the ID embedded in the content matches the unique ID of the EMA stored in the flash memory 12. If the embedded ID matches the stored unique ID of the EMA as determined at step S15, the EMA permits the use of the content at step S16, while, if the embedded ID does not match the stored unique ID, the EMA does not permit (i.e., inhibits) the use of the content at step S17. In the case where the ID is embedded in the content using the scheme of the above-mentioned first example, the determination at step S15 may be made by decrypting the encrypted content using the unique ID as a decryption key, and, if the content is successfully decrypted in this manner, then the use of the content is permitted. In the case where the ID is embedded in the content using the scheme of the above-mentioned second example, on the other hand, the ID embedded as the content-use limiting information embedded in the content may be compared to the unique ID of the EMA to determine whether the two IDs match each other.

Figure 4:
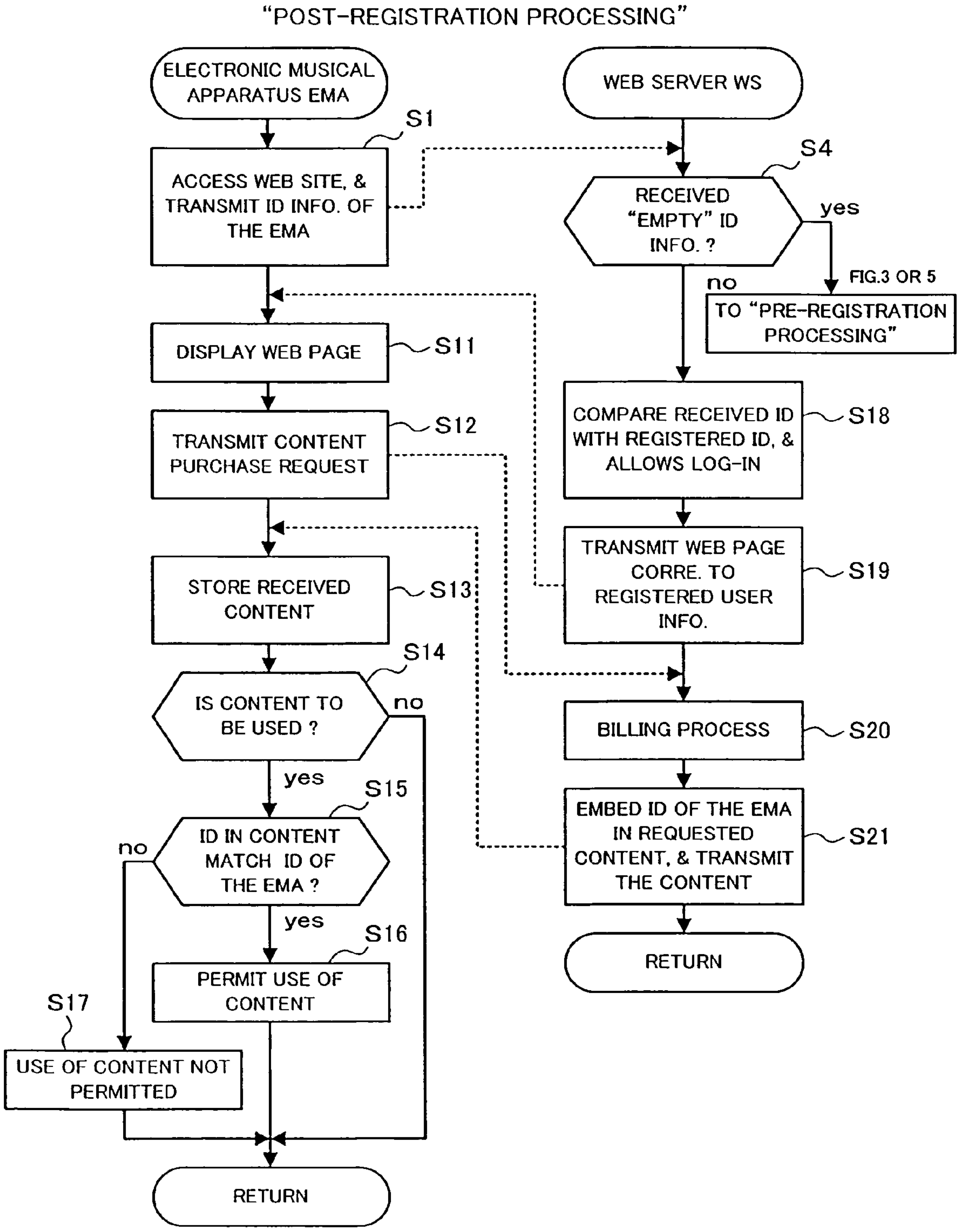
FIG. 4 is a flow chart showing an example of "post-registration processing" carried out when the electronic musical apparatus accesses a Web site after unique ID registration of the electronic musical apparatus.

Namely, in the embodiments of FIGS. 3 and 4, the WS determines at step S4 whether a unique ID has already been issued to a given EMA having accessed the WS, and it can supply the EMA with Web page information differing in contents depending on a result of the determination. That is, the WS transmits a user registration form to the EMA if no unique ID has been issued yet (step S35), but supplies the EMA with a Web page for a registered user if the unique ID has already been issued (i.e., control proceeds from the NO determination at step S4 to steps S18 and S19 of FIG. 4). In this manner, the WS can perform fine and elaborate Web page supply services, e.g. automatically supplying unique-ID issuing Web page information to each user having accessed the WS via an EMA with no unique ID issued and registered therefor, and supplying Web page information, providing a particular service, to each user having accessed the WS via a EMA with an unique ID already issued and registered therefore (such as Web page information customized for that EMA or user).

This and following paragraphs describe another embodiment of the pre-registration processing, which is directed to issuing and registering a unique ID in a different manner from the embodiment of FIG. 3. Namely, in the embodiment of FIG. 5, operations for issuing a unique ID to a given EMA having accessed the WS and registering the user of the given EMA when an ID issuance request has been transmitted from the user (EMA).

ID information transmission by the EMA (step S1) and determination by the WS as to whether or not the ID information indicates "empty" (step S4) are similar to those of FIG. 3. Once the WE ascertains that the received ID information indicates "empty" (YES determination at step S4), it transmits a "Web page for unregistered users" to the EMA at step S35. If, on the other hand, the ID information does not indicate "empty" as determined at step S4, the WS proceeds to "post-registration processing" of FIG. 4 (as detailed in relation to step S18), without further performing the "pre-registration processing of FIG. 5. The "Web page for unregistered users" is a page that allows a guest user to use the Web site without having to log in as a formally-registered (regular) user. The EMA displays the Web page for unregistered users, received from the WS, on the display 6A of FIG. 2, at step S31. After that, operations corresponding to the displayed Web page for unregistered users are carried out. In the illustrated example of FIG. 5, it is assumed that free content, usable by any interested person on a free-of-use charge, is supplied on the Web page for unregistered users of the Web site provided by the WS. On the EMA, the user can view the Web page for unregistered users displayed on the display device and transmit a download request for desired free content, at step S32. The WS transmits the desired free content in response to the download request, at step 36. Then, the EMA can store the free content, received from the WS, in memory, reproductively use the received free content, and so on (step S33).

Figure 5:
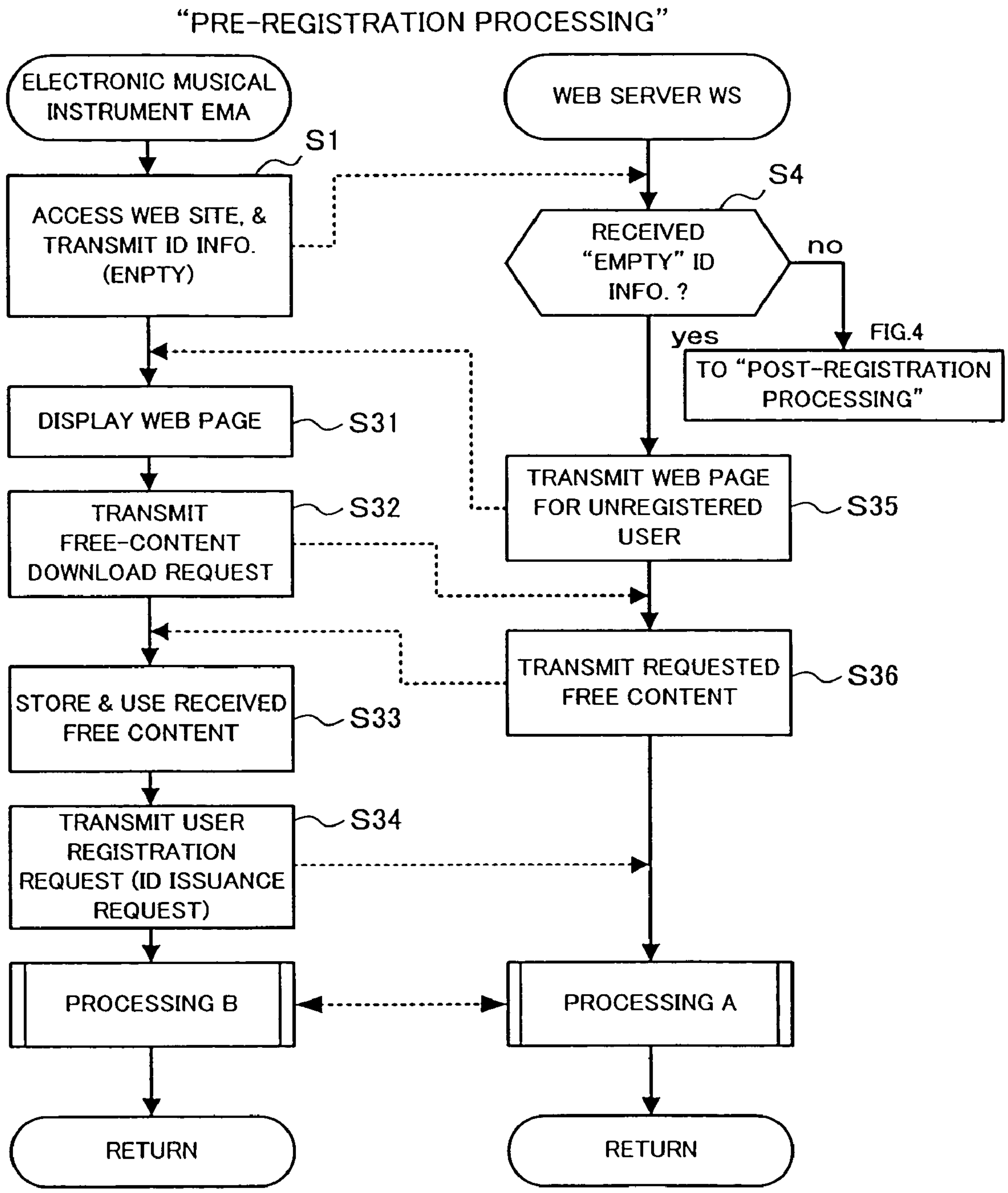
FIG. 5 is a flow chart showing another example of the "pre-registration processing"

In the embodiment of FIG. 5, the user having accessed the Web site can perform user-registration requesting operation to generate and transmit a user registration request at step S34, when he or she actually so desires. As in the embodiment of FIG. 3, the issuance and registration and storage of the unique ID and the user registration are carried out in the embodiment of FIG. 5 concurrently as a set of operations. Therefore, generating the user registration request at step S34 is equivalent to generating a unique ID issuance request. Upon receipt of the user registration request from the EMA, the WS is brought to a state for performing "server-side ID issuance and user registration operations" similar to the above-described "processing A", i.e. operations of steps S5-S8 of FIG. 3. The electronic musical apparatus EMA, on the other hand, is brought to a state for performing carries out "user-side user registration and ID storage operations" similar to the above-described "processing B", i.e. operations of steps S2-S3 of FIG. 3. In this way, processing similar to "processing A" and "processing B" of FIG. 3 is carried out in the embodiment of FIG. 5, so that the issuance and registration and storage of the unique ID and the user registration are carried out concurrently as a set of operations.

Namely, in the embodiment of FIG. 5, the Web server WS is arranged to issue a unique ID to a given EMA having accessed the Web server WS (through processing A and processing B), in response to an ID issuance request from the given EMA (step S34). Therefore, the user of the given EMA can acquire the ID at any desired time according to his or her convenience. In the embodiments of FIGS. 5 and 4 too, the WS determines at step S4 whether a unique ID has already been issued to a given EMA having accessed the WS, and it can supply the EMA with Web page information differing in contents depending on a result of the determination. That is, the WS transmits a Web page for unregistered users to the EMA if no unique ID has been issued yet (step S35), but supplies a Web page for a registered user if a unique ID has been issued (i.e., control proceeds from the NO determination at step of S4 to steps S18 and S19 of FIG. 4). In this manner, the WS can perform fine and elaborate Web page supply services, e.g. automatically supplying Web page information for unregistered users to each user having accessed the WS via an EMA with no unique ID issued and registered therefor, and supplying Web page information, providing a particular service, to each user having accessed the WS via an EMA with an unique ID already issued and registered therefore. (such as Web page information customized for that EMA or user).

Figure 6:
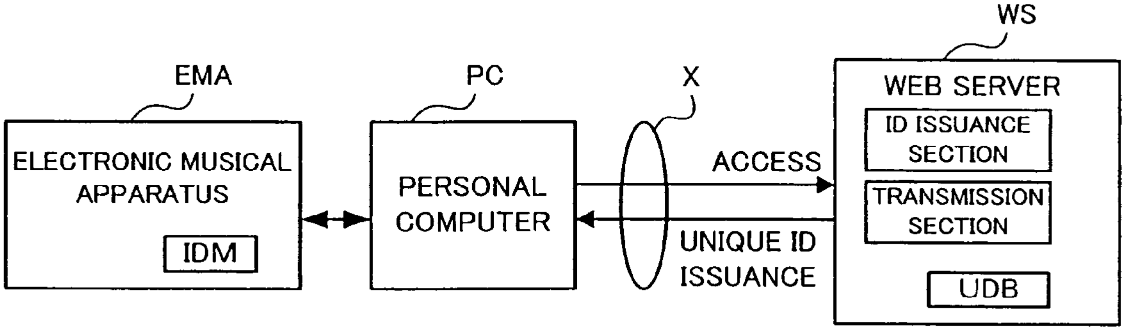
FIG. 6 is a schematic system diagram showing another embodiment of the present invention.

FIG. 6 shows another embodiment of the present invention, which is constructed in such a manner that, even where an electronic musical apparatus of a given user does not itself have a Web site accessing function (browsing function), the electronic musical apparatus is allowed to perform the necessary unique ID issuance, registration and storage operations and user registration operation with the assistance of an external processing device, such as a personal computer. In the embodiment of FIG. 6, the electronic musical apparatus EMA has a storage area IDM (e.g., flash memory) for storing a unique ID in a non-volatile manner. However, in an initial condition, e.g. condition at the time of shipment from a factory, such a unique ID is not yet stored in the storage area IDM. The electronic musical apparatus EMA does not itself have the Web site accessing function (browsing function), but it is capable of wired or wireless communication with an external processing device, such as a personal computer PC. In this case, the external personal computer PC performs a function of communicating with the Web server WS (server computer 30) via the communication network on behalf of the electronic musical apparatus EMA. Also, control programs, like those shown in FIGS. 3-5, to be executed by the electronic musical apparatus EMA for the unique ID issuance, registration and storage operations and user registration operation are also provided in the external personal computer PC, so that the personal computer PC carries out the unique ID issuance, registration and storage operations and user registration operation on behalf of the electronic musical apparatus EMA. Once the personal computer PC acquires a unique ID of the electronic musical apparatus EMA from the Web server WS, it delivers the acquired ID to the musical apparatus EMA so that the ID is stored in the storage area IDM (e.g., flash memory) within the musical apparatus EMA.

The embodiments have been described above in relation to the case where the unique ID issuance, registration and storage operations and the user registration operation are carried out concurrently as a set of operations. However, the present invention is not so limited, and the unique ID issuance, registration and storage operations and the user registration operation may be carried out separately. Further, the user registration may be dispensed with as apprpriate.

Further, whereas the embodiments have been described above in relation to the case where the Web server WS has all of the function of supplying Web page information (Web site), the function of issuing and registering a unique ID and the function of managing the user database, these functions may be performed by separate servers. For example, there may be provide separately a server that has the function of supplying Web page information (Web site) and a server that has the functions of issuing and registering a unique ID and managing the user database. In this case, the electronic musical apparatus EMA or the personal computer PC accesses a desired Web site provided by any one of the Web servers, and a management server may communicate with the electronic musical apparatus EMA or the personal computer PC by way of the Web server; in this instance, the Web server and the management server together constitute a "Web server WS" as referred to in the above-described embodiments, i.e. a "server apparatus" of the present invention.

What is claimed is:

1. A system comprising:

an electronic musical apparatus including a memory having a storage area for storing unique identification information in a non-volatile manner, unique identification information being empty in said storage area in an initial condition under which said electronic musical apparatus is used by a user for a first time; and a processing device capable of communicating with said electronic musical apparatus, wherein said processing device is adapted to:

access, via a communication network, a predetermined Web site having an identification information issuing function;

receiving an ID data file from the predetermined Web site, the ID data file containing unique identification information identifying said electronic music apparatus, interpret the received ID data file, and retrieve the unique identification information from the interpreted ID data files; and deliver the retrieved unique identification information to said electronic musical apparatus, and wherein said electronic musical apparatus stores the unique identification information, delivered by said processing device, in said storage area of said memory;

wherein said processing device, upon accessing the Web site, receives Web page information differing in contents depending on whether or not any unique identification information has already been issued to said electronic musical apparatus; and wherein said Web page information includes services for selling music content when a unique identification information has been issued to said electronic musical apparatus and includes free content when a unique identification information has not been issued to said electronic musical apparatus.

2. A server apparatus building a Web site for supplying information onto a communication network, said server apparatus comprising:

an ID issuance section that issues unique identification information to a given electronic musical apparatus having accessed the Web site via the communication network; and a transmission section that creates an ID data file containing the unique identification information and transmits the created ID data file to said electronic music apparatus via the communication network, wherein said electronic musical apparatus can receive the created ID data file transmitted via the communication network, interpret the received ID data file, retrieve the unique identification information from the interpreted ID data file and store the retrieved unique identification information in a non-volatile manner;

wherein said server apparatus makes a determination as to whether or not any unique identification information has already been issued to said given electronic musical apparatus having accessed the Web site, and supplies said given electronic musical apparatus with Web page information differing in contents depending on a result of the determination; and wherein said Web page information includes services for selling music content when the server apparatus makes a determination that a unique identification information has been issued to said given electronic musical apparatus and includes free content when the server apparatus makes a determination that a unique identification information has not been issued to said given electronic musical apparatus.

3. A server apparatus as claimed in claim 2 wherein when it is determined that no unique identification information has been issued yet, said ID issuance section issues a unique identification information to said given electronic musical apparatus.

4. A server apparatus as claimed in claim 2 wherein said ID issuance section issues a unique identification information to said given electronic musical apparatus in response to an ID issuance request received from said given electronic musical apparatus having accessed the Web site.

5. A server apparatus as claimed in claim 2 wherein said ID issuance section issues a unique identification information to said given electronic musical apparatus when said server apparatus performs a user registration process in the Web site for said given electronic musical apparatus.

6. A computer-readable medium having stored a program containing a group of instructions for causing a computer of a server apparatus to perform a process for supplying unique identification information to an electronic musical apparatus in a terminal, said server apparatus building a Web site for supplying information onto a communication network, said process comprising:

issuing unique identification information to a given electronic musical apparatus having accessed the Web site via the communication network;

creating an ID data file containing the unique identification information; and transmitting the created ID data file to said electronic musical apparatus via the communication network, wherein said electronic musical apparatus can receive the created ID data file transmitted via the communication network, interpret the received ID data file, retrieve the unique identification information from the interpreted ID data file and store the retrieved unique identification information in a non-volatile manner;

wherein said process further comprises making a determination as to whether or not any unique identification information has already been issued to said electronic musical apparatus having accessed the Web site, and supplying said electronic musical apparatus with Web page information differing in contents depending on a result of the determination; and wherein said Web page information includes services for selling music content when the server apparatus makes a determination that a unique identification information has been issued to said electronic musical apparatus and includes free content when the server apparatus makes a determination that a unique identification information has not been issued to said electronic musical apparatus.

* * * * *